Oct. 3, 1939.  W. S. BRINK  2,174,616
TIRE RIM
Filed Jan. 27, 1934  4 Sheets-Sheet 1
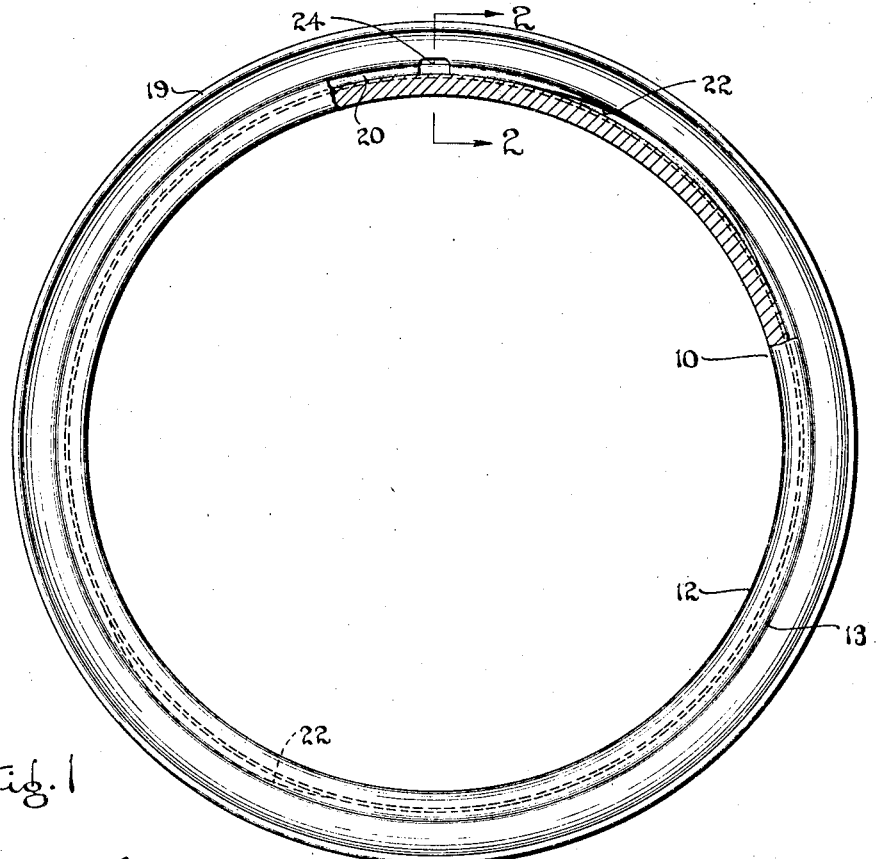
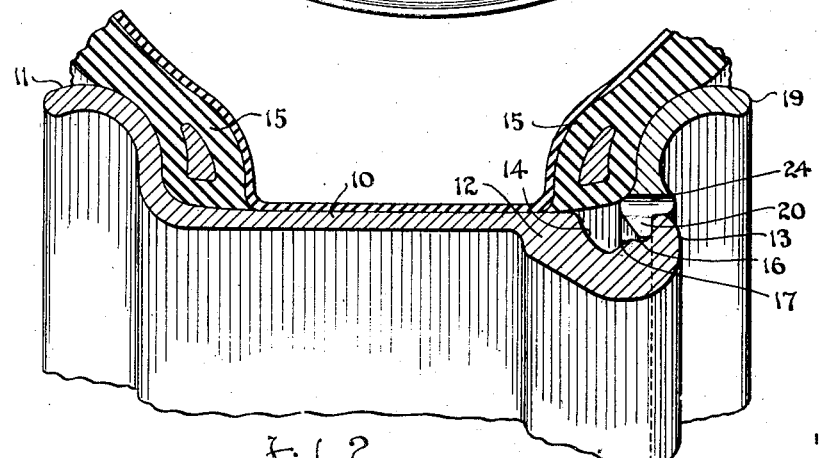
INVENTOR
Winfield Scott Brink
Ely + Barrow
ATTORNEYS Oct. 3, 1939.    W. S. BRINK    2,174,616
TIRE RIM
Filed Jan. 27, 1934    4 Sheets-Sheet 2

INVENTOR
Winfield Scott Brink
Ely & Barrow
ATTORNEY

Oct. 3, 1939.  W. S. BRINK  2,174,616
TIRE RIM
Filed Jan. 27, 1934  4 Sheets-Sheet 4

INVENTOR
Winfield Scott Brink
BY
Ely & Barrow
ATTORNEYS

Patented Oct. 3, 1939

2,174,616

UNITED STATES PATENT OFFICE 2,174,616

TIRE RIM

Winfield S. Brink, Akron, Ohio, assignor, by mesne assignments, to The Firestone Tire & Rubber Company, Akron, Ohio, a corporation of Ohio Application January 27, 1934, Serial No. 708,624

23 Claims. (Cl. 152—411)

This invention relates to tire rims, and more especially it relates to rims for pneumatic vehicle tires wherein an endless rim-base is provided on one lateral margin with an integral, circumferential flange and on the other lateral margin is provided with an endless removable tire-retaining ring.

The invention is of especial utility in wheel rims that carry tires of larger cross-section and smaller rim diameter, wherein the removable flange requires to be of such size and strength as normally to resist the springing or distortion necessary to effect its mounting and/or removal. In some respects this application is a continuation of my co-pending applications, Serial No. 545,765, filed June 20, 1931, Serial No. 584,049, filed December 31, 1931, and Serial No. 660,015, filed March 8, 1933.

The chief objects of the invention are to facilitate the removal of the removable endless ring from the rim-base; to provide a rim having a removable endless side-ring wherein removal or mounting of the ring is accomplished with the minimum of distortion thereof, and such distortion as is required is facilitated; to provide automatically for centering the removable ring on its seat upon inflation of the tire; and to prevent any possibility of the ring being blown off the rim during the inflation of a tire thereon. Other objects will be manifest.

Of the accompanying drawings:

Figure 1 is a side elevation of a tire rim embodying the invention in its preferred form, a portion of the rim base being broken away and in section;

Figure 2 is a section on a larger scale on the line 2—2 of Figure 1, and a tire mounted upon the rim;

Figures 3, 4, 5:
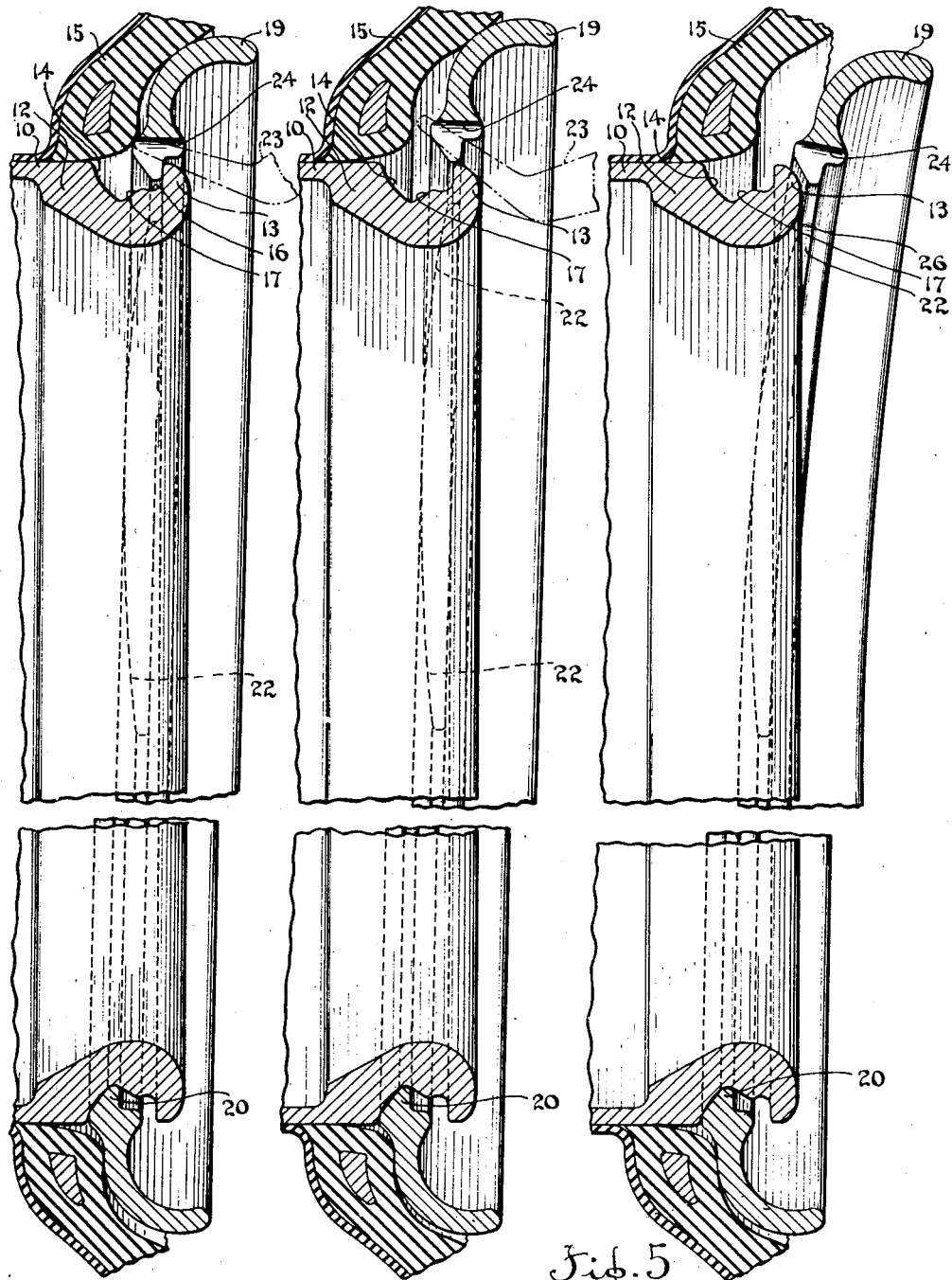
Figure 3 is a diametric section, on a larger scale, through the ring-side of the rim shown in Figure 1, and a tire thereon, showing the first step in the operation of removing the endless ring from the rim.
Figure 4 is a view similar to Figure 3, showing the succeeding step in the removal of the ring.
Figure 5 is a view similar to Figures 3 and 4 showing the next succeeding step in the removal of the ring.

Referring to the drawings, 10 is an endless tire rim base having one lateral margin formed with an integral, circumferential tire-retaining flange 11, and having its other lateral marginal portion extended obliquely inwardly at 12 and radially outwardly at 13 to define a circumferential gutter or groove 14. The outer periphery of the marginal portion 13 is flush with or slightly below the outer periphery of the base portion 10 of the rim to permit a tire casing to pass over it in being mounted upon or removed from the rim, the bead portions of a tire being shown at 15, 15 on the drawings. Formed within the gutter 14, against the radially extending wall 13, is a circumferential ledge 16 that has an oblique lateral face 17 extending to the bottom of the gutter, the ledge 16 being disposed about midway between the latter and the top of radial portion 13.

The rim is provided with a removable tire-retaining ring 19 that normally seats upon the perimeter of rim portion 13, beside gutter 14, as is most clearly shown in Figure 2, and said ring is formed on its inner periphery with an inwardly extending circumferential flange 20 that normally abuts the inner lateral face of rim portion 13, the inner periphery of said flange being spaced slightly from ledge 16. The inside diameter of flange 20 is less than the distance from the bottom of gutter 14 on one side of the rim to the top of wall 13 on the diametrically opposite side of the rim, as is most clearly shown in Figure 3, with the result that accidental removal of the ring 19 from the rim positively is prevented.

To facilitate passage of the ring 19 over rim portion 13, during mounting and/or removal of the ring, the flange 20 thereof is arcuately cut away or recessed at diametrically opposite sides of the ring, said recesses being designated 22. A prying tool or lever 23 is required for removing the ring 19, and the inner periphery of the ring, including flange 20, is notched or slotted at 24 to permit the tool 23 to engage under the ring, whereby the top of wall 13 may be used as a fulcrum. The slot 24 is disposed, angularly of the ring 19, nearer to one of the recesses 22 than the other, as shown. It is found that best results are obtained when the slot 24 is disposed relatively close to a recess 22, say 6 or 7 inches from the center of the latter. This distance may vary somewhat with various size rings, it being understood that the slot is positioned where it permits removal of the ring with the least effort.

To remove the ring 19 from the rim 10, the tire on said rim first is deflated, after which the ring 19 is moved laterally off rim portion 13 into gutter 14 and then moved in its own plane toward the slot 24 so as to be eccentrically disposed with relation to the base, the side of the ring opposite said slot 24 reposing in the bottom of said gutter, as is more clearly shown in Figure 3. It will be noted that in this position the portion of ring 19, diametrically opposite the portion in the gutter, still remains in overlapping relation with rim portion 13. Next the tool 23 is inserted in slot 24, and by fulcruming the tool on the wall portion 13, the ring 19 is resiliently deformed out of round sufficiently for that portion of the ring adjacent the nearest recess 22 to be lifted above rim portion 13, as shown in Figure 4, and moved laterally over said rim portion by flexing the ring somewhat in its own plane.

Figure 6:
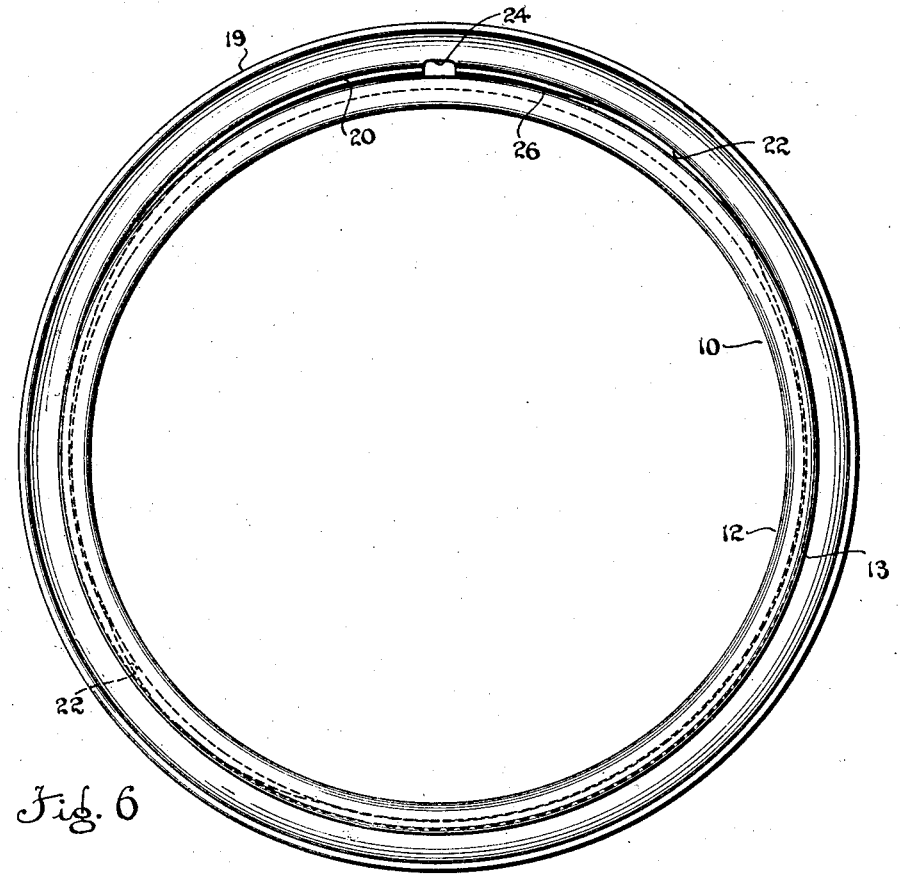
Figure 6 is a side elevation of the improved tire rim with the removable ring thereof substantially in the same position it occupies in Figure 4.
Figure 7:
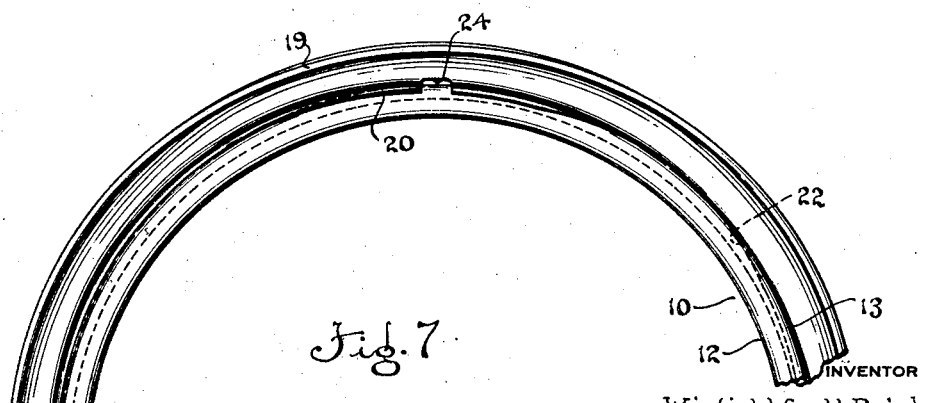
Figure 7 is a fragmentary side elevation of the rim showing the removable ring thereof substantially in the position shown in Figure 5.
Figure 8:
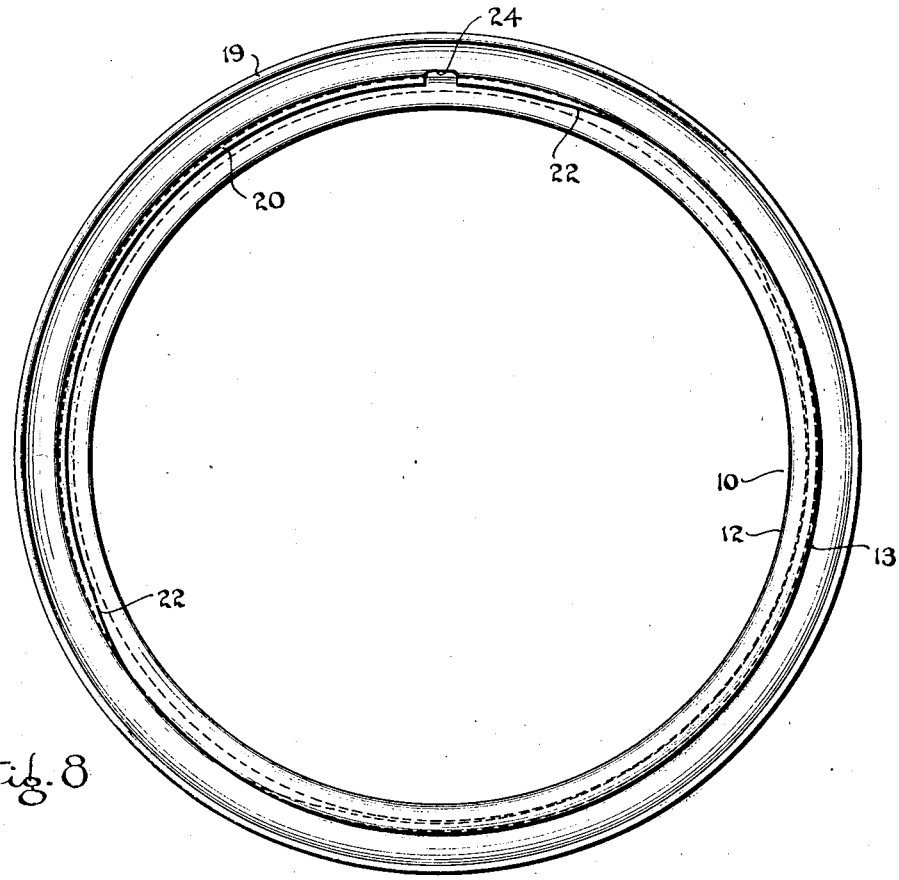
Figure 8 is a view similar to Figure 6 showing the side-ring of the rim about half off, from which position it is easily removed by hand.

This movement of the ring snaps that end of recess 22 nearest slot 24 over the rim portion 13 to the outer side thereof so that the recess spans said rim portion 13, as indicated at 26, Figures 5 and 6, with the result that tool 23 may be removed, the said recess 22 permitting the ring substantially to resume its circular form as shown in Figures 5 and 7, but still deformed out of its own plane with a portion of its structure outside rim portion 13. It is then an easy matter to pull the ring over rim portion 13 progressively toward the other recess 22 with but slight springing of the ring. When the ring is about half way off, as shown in Figure 8, the other recess 22 moves over rim portion 13, permitting the ring to assume its normal plane form, and allowing it completely to be removed from the rim by movement in its own plane toward the side yet in the gutter.

A tire is mounted upon the rim 10 while the ring 19 is dismounted therefrom, the tire easily passing over the rim portion 13. The operation of mounting ring 19 on the rim is substantially the reverse of the manner of removing it therefrom. One side of the ring, midway between recesses 22, is placed in the gutter 14 of the rim, and the ring manipulated until one end of each slot 22 is in the gutter, each slot 22 spanning the rim portion 13 as in Figure 8. Then starting at the recess remote from slot 24, the ring may be progressively worked over portion 13 by a succession of sharp blows delivered against the side of the ring, the ring deforming out of its normal plane as it moves into the gutter. When the ring reaches the position shown in Figure 7, the tool 23 is inserted in slot 24 and the ring distorted out of round sufficiently to permit the remainder of the ring to be lifted over rim portion 13 into gutter 14.

The ring is then centered so that it seats properly upon the outer periphery of rim portion 13 as shown in Figure 2. If the ring 19 is not properly seated at the time inflation of the tire is started, lateral pressure of the tire bead 15 will be applied first against the nearest portion of the ring, which will be that portion of the latter that is in the bottom of gutter 14. Lateral pressure against this portion of the ring causes the flange 20 of the ring to ride up the oblique surface 17 of ledge 16 and thus automatically to effect proper seating of the ring. The arrangement is such as to eliminate the possibility of blowing the ring 19 off the rim during the inflation of the tire.

The recesses 22 facilitate the removal of the ring 19 by providing a local region in the ring where the inside diameter thereof is increased. The ring also has greater resilience at the recesses 22, thus facilitating springing of the ring, both in and out of its own plane, in the mounting and removal of the ring.

Figure 9:
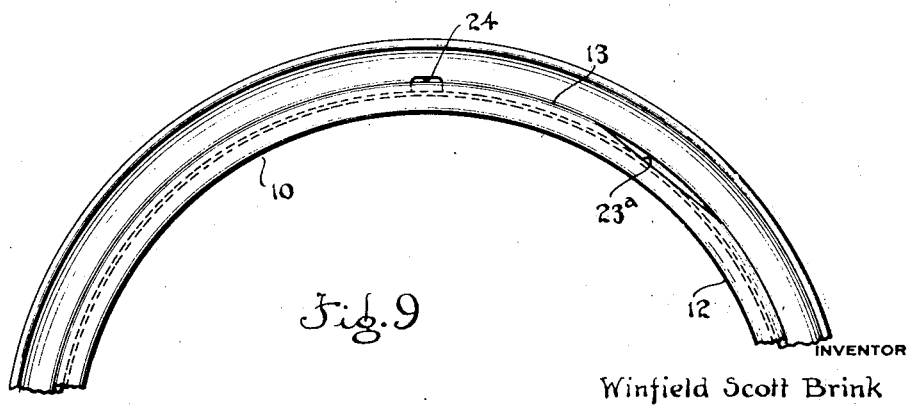
Figure 9 is a fragmentary side elevation of another embodiment of the invention.

In the embodiment of the invention shown in Figure 9, the rim portion 13 is formed with cutaway portions 22a at diametrically opposite points on the rim in place of the recesses 22 on ring 19 of the other embodiment of the invention.

Other modification may be resorted to without departing from the spirit of the invention or the scope of the appended claims.

What is claimed is:

1. A wheel rim comprising an annular tire-seating rim formed with a gutter along one margin thereof and a radially extending wall constituting a side of said gutter, and an endless tire-retaining ring adapted to be mounted on said wall and adapted to enter said gutter, the inside diameter of said ring being smaller than the distance from the bottom of said gutter to the top of said wall at the diametrically opposite side of said rim, said ring having a region of locally increased inside diameter.

2. A wheel rim comprising a continuous annular rim base formed with a circumferentially extending depression having a radial wall along one margin thereof, an endless tire retaining ring mounted adjacent said wall at one side of said depression, a portion of said ring being adapted to enter the depression, said ring being adapted to be sprung to clear the side of the wall opposite the portion of the ring in the depression for removal of the ring from said rim, and means consisting of recesses extending for not more than one-fourth the inner circumference of said tire retaining ring, said recesses being of sufficient depth and extent to permit the engagement of said ring at the recesses over the flange when a portion of the ring intermediate the recesses is disposed in the bottom of the gutter.

3. A wheel rim comprising a continuous annular tire seating rim base provided with an outer peripheral circumferentially extending depression and having a radial wall constituting a side of said depression, and a continuous tire-retaining ring normally mounted upon said rim adjacent said radial wall, said wall and said ring having overlapping portions at the outer part of said wall to prevent axial removal of said ring from said rim, one of said overlapping portions being formed with diametrically opposite recesses extending for not more than one-fourth the inner circumference of said ring, whereby a portion of said ring intermediate said recesses may be engaged in the bottom of said depression and said ring and flange interengaged at the recesses to remove the ring by a relative movement of said ring and said rim substantially at right angles to the axis thereof.

4. A wheel rim comprising a continuous annular tire-seating rim base formed with an outer peripheral circumferentially extending depression having a radially outwardly extending wall constituting a side of said depression, and a continuous tire-retaining ring normally seated upon said wall and having a radial flange engaging a side face of said wall to prevent axial removal of the ring from the rim, the radial flange on said ring being formed with diametrically opposite notches adapted to span said rim flange when one portion of the ring intermediate the notches is caused to enter the depression to interengage the ring and said wall at the notches, thereby to facilitate removal of the ring from said rim by movement in a direction substantially in the plane of the ring.

5. A wheel rim comprising a continuous annular tire-seating rim base formed with an outer peripheral gutter along one margin thereof and provided with an upstanding radial wall constituting an outer side of said gutter and a continuous tire-retaining ring having an inner peripheral portion extending part way into said gutter so as to be normally retained on said rim by said wall, the inner peripheral portion of the ring within the gutter being formed with concave arcuate notches of just sufficient depth and extent to span said wall when a portion of said wall intermediate said notches is depressed into the bottom of the gutter, and constituting guiding means for facilitating removal of the ring from said rim when one side of the side ring is dropped into said gutter and said notches are engaged over said wall.

6. In a tire rim, the combination of an endless base member, an endless ring mountable upon a marginal portion of said base member, means at diametrically opposite sides of the rim for facilitating the mounting and dismounting of the ring on the base member, and means for bringing the last mentioned means into operation in succession during the dismounting of the ring.

7. In a tire rim, the combination of an endless base member, an endless ring mountable upon a marginal portion thereof, means at diametrically opposite sides of the ring for facilitating the mounting and removal of the ring from the base member, and means for bringing the last mentioned means into operation in succession during the dismounting of the ring.

8. In a tire rim, the combination of an endless base member, an endless ring mountable upon a marginal portion thereof, said ring having a plurality of cut-away portions on its inner perimeter to facilitate mounting and removal of the ring from the base member, and means for bringing said cut-away portions into operation in succession during the removal of the ring from the base member.

9. In a tire rim, the combination of an endless base member, an endless tire-retaining ring mountable upon a marginal portion thereof, said ring being formed with two arcuate recesses at diametrically opposite points of its inner periphery, to facilitate mounting and dismounting of the ring, and means for dismounting the ring in a manner that brings one of said recesses into operation before the other.

10. In a tire rim, the combination of an endless base member, and an endless tire-retaining ring mountable upon a marginal portion thereof, said ring being formed with cut-away portions at diametrically opposite sides of its inner periphery, and a tool-receiving slot disposed nearer one recess than the other whereby said recesses are brought into operation in succession during the removal of the ring.

11. A wheel rim comprising an annular tire-seating rim base formed with an outer peripheral gutter along one margin thereof and a radially extending flange constituting a side of said gutter, and an endless tire-retaining side ring normally mounted upon said flange and adapted to enter said gutter, said ring being formed with recesses at opposite regions of its inner periphery to facilitate its removal from the rim base, said recesses extending for not more than one-fourth the inner circumference of said side ring and being of sufficient depth and extent to permit the engagement of said ring at the recesses over the flange when a portion of the ring intermediate the recesses is disposed in the bottom of the gutter.

12. In a tire rim, the combination of an endless base member formed on one lateral marginal portion with a circumferential gutter, a radial flange on said base member constituting the outer wall of said gutter, and a removable endless tire-retaining ring mountable upon the base member and formed with an inwardly extending flange normally extending into said gutter and having a lateral bearing against the radial flange constituting the outer wall of the gutter, the peripheral edge of said radial flange affording a radial seat for said ring, said ring having a seating portion extending in a substantially axial direction and being adapted to seat upon the peripheral edge seating portion of said radial flange, said gutter having a sloping wall that extends from its bottom obliquely toward the peripheral edge of said radial flange, said inwardly extending flange on the tire retaining ring being slidably engageable with said sloping wall whereby upon lateral pressure being exerted upon said tire retaining ring the latter may be guided to a position laterally against said radial flange with the ring seated radially on said flange.

13. In a tire rim, the combination of an endless base member formed on one lateral marginal portion with a circumferential gutter, a radial flange on said base member constituting the outer wall of said gutter, and a removable endless tire-retaining ring mountable upon the base member and formed with an inwardly extending flange and having a lateral bearing against the radial flange constituting the outer wall of the gutter, the peripheral edge of said radial flange affording a radial seat for said ring, said ring having a seating portion extending in a substantially axial direction and being adapted to seat upon the peripheral edge seating portion of said radial flange, said gutter having a sloping wall that extends from its bottom obliquely toward the peripheral edge of said radial flange, an annular ledge in said gutter intermediate said sloping wall and the peripheral edge of said radial flange, said inwardly extending flange on said tire retaining ring extending substantially into contact with said ledge when the side ring is in its normally assembled position, said inwardly extending flange on the tire retaining ring being slidably engageable with said sloping wall whereby upon lateral pressure being exerted upon said tire retaining ring the latter may be guided to a position laterally against said radial flange with the ring seated radially on said flange.

14. In a vehicle wheel rim assembly, the combination of a tire-supporting rim and an endless tire-retaining ring capable of being removably secured to said rim, said rim member provided along one edge with a groove, an annular seat on said rim on one side of said groove and a complementary seat on said ring, the inner diameter of said ring being less than the distance from the bottom of said groove to the outer periphery of said seat on said rim at a diametrically opposite point and one of said seats having an increased diameter in a local area.

15. In a vehicle wheel rim assembly, the combination of a tire-supporting rim and an endless tire-retaining ring capable of being removably secured to said rim, said rim member provided along one edge with a groove, an annular seat on said rim on one side of said groove and a complementary seat on said ring, the inner diameter of said ring being less than the distance from the bottom of said groove to the outer periphery of said seat on said rim at a diametrically opposite point, and the seat on said ring having an increased diameter in a local area.

16. In a vehicle wheel rim assembly, the combination of a tire-supporting rim and an endless tire-retaining ring capable of being removably secured to said rim, said rim member provided along one edge with a groove, an annular seat on said rim on one side of said groove and a complementary seat on said ring, said seats having overlapping portions to prevent axial removal of said ring from said rim, the inner diameter of said ring being less than the distance from the bottom of said groove to the outer periphery of said seat on said rim at a diametrically opposite point, and one of said overlapping portions being recessed in a local area.

17. In a tire rim, the combination of an endless base member, and an endless ring mountable upon a marginal portion of said base member, said marginal portion of said base member being formed with a gutter and a retaining flange, the latter normally preventing removal of said endless ring, said endless ring being formed with a recess on its inner periphery in a local area, the inner periphery of said endless ring being formed with a tool slot adjacent said recess, whereby the following operations may be performed for dismounting the endless ring from the base member, to-wit, a tool inserted in said tool receiving slot, a diametrically opposed portion of the endless ring positioned within the gutter, the endless ring flexed out of its normal plane and pried over said retaining flange at said recess and then pried over said retaining flange progressively circumferentially about said base member.

18. In a tire rim, the combination of an endless base member, and an endless ring mountable upon a marginal portion of said base member, said marginal portion of said base member being formed with a gutter and a retaining flange, the latter normally preventing removal of said endless ring, said endless ring being formed with an arcuate recess on its inner periphery in a local area, the inner periphery of said endless ring being formed with a tool slot adjacent said recess.

19. In a tire rim, the combination of an endless base member, and an endless ring mountable upon a marginal portion of said base member, said marginal portion of said base member being formed with a gutter and a retaining flange, the latter normally preventing removal of said endless ring, said endless ring being formed with an arcuate recess on its inner periphery extending for not more than one-fourth the circumference thereof, said recess being of sufficient depth and extent to permit the engagement of said ring at the recess over the retaining flange when a portion of the ring remote from the recess is disposed in the bottom of the gutter.

20. In a tire rim, the combination of an endless base member, and an endless ring mountable upon a marginal portion of said base member, said marginal portion of said base member being formed with a gutter and a retaining flange, the latter normally preventing removal of said endless ring, said endless ring being formed with a recess on its inner periphery extending for not more than one-fourth the circumference thereof, said recess being of sufficient depth and extent to permit the engagement of said ring at the recess over the retaining flange when a portion of the ring remote from the recess is disposed in the bottom of the gutter.

21. In a tire rim, the combination of an endless base member, and an endless ring mountable upon a marginal portion of said base member, said ring being formed with a radially inwardly extending flange, said marginal portion of said base member being formed with a gutter and a radially outwardly extending retaining flange, said flanges normally overlapping and preventing removal of said endless ring, the flange on said endless ring being formed with a recess in a local area, the inner periphery of said endless ring being formed with a tool slot adjacent said recess, whereby the following operations may be performed for dismounting the endless ring from the base member, to-wit, a tool inserted in said tool receiving slot, a diametrically opposed portion of the endless ring positioned within the gutter, the endless ring flexed out of its normal plane and pried over said retaining flange at said recess and then pried over said retaining flange progressively circumferentially about said base member.

22. In a tire rim, the combination of an endless base member, and an endless ring mountable upon a marginal portion of said base member, said ring being formed with a radially inwardly extending flange, said marginal portion of said base member being formed with a gutter and a radially outwardly extending retaining flange, said flanges normally overlapping and preventing removal of said endless ring, one of said flanges being formed with a recess extending for not more than one-fourth the circumference thereof, said recess being of sufficient depth and extent to permit the engagement of said ring at the recess over the retaining flange when a portion of the ring remote from the recess is disposed in the bottom of the gutter.

23. In a vehicle wheel rim assembly, the combination of a tire supporting rim element, and an endless tire-retaining ring element, complementary annular seats on said rim and ring whereby the latter may be removably held on said rim, said seats provided with a circumferentially extending clearance area and one of said elements provided with an opening adjacent said clearance area for the insertion of a prying tool.

WINFIELD S. BRINK.